United States Patent [19]

Finn et al.

[11] 3,824,759

[45] July 23, 1974

[54] METHOD AND APPARATUS FOR HANDLING STACKABLE BODIES

[75] Inventors: Lawrence R. Finn; Richard L. Smith, both of Toledo, Ohio

[73] Assignee: Owens-Corning Fiberglas Corporation, Toledo, Ohio

[22] Filed: Jan. 18, 1973

[21] Appl. No.: 324,615

[52] U.S. Cl.................... 53/24, 53/124 D, 100/140, 100/278, 100/295
[51] Int. Cl............................................ B65b 63/02
[58] Field of Search...... 53/24, 124 D; 100/35, 278, 100/140, 295, DIG. 15; 214/654

[56] References Cited
UNITED STATES PATENTS

| | | | |
|---|---|---|---|
| 2,711,642 | 6/1955 | Meyer | 100/219 X |
| 3,117,513 | 1/1964 | Burnett et al. | 53/124 DX |
| 3,242,851 | 3/1966 | Brawley et al. | 100/DIG. 15 |

*Primary Examiner*—Travis S. McGehee
*Attorney, Agent, or Firm*—Staelin & Overman

[57] ABSTRACT

A method and apparatus are provided for handling compressible batts of glass fiber insulation. The batts are sequentially removed from a conveyor line and stacked on one another at a loading or stacking station to a predetermined number or height. The stack of batts is moved away from the point of stacking and compressed by a bat compressing and carrying unit, and additional compressible batts are sequentially removed from the conveyor line and stacked at the stacking station. The second stack of batts is then compressed adjacent the first stack by the unit and the two stacks moved together by the unit from the stacking station to a packaging station. Suction is applied to the two stacks of batts at the packaging station while fingers of the batt compressing and carrying unit, which fingers supply the compressive forces on the batts, are moved apart and retracted. The two stacks of batts are then packaged at the second station while additional batts are removed from the line and stacked at the stacking station for the next package.

21 Claims, 4 Drawing Figures

METHOD AND APPARATUS FOR HANDLING STACKABLE BODIES

This invention relates to a method and apparatus for handling stackable bodies and more specifically compressible batts of glass fiber insulation.

Heretofore in the production of glass fiber insulation batts, the batts, when cut to length, moved along a conveyor line and were removed sequentially by a workman who would stack a number of the batts at a stacking station along side the conveyor. A second workman would then carry this stack of batts to a packaging machine at a packaging station spaced from the loading station. The first workman would continue to stack additional batts at the stacking station and the second stack would be carried by the second workman to the packaging station and placed on the first stack of batts in the packaging machine. The packaging machine would compress and package these two stacks into a paper container or bag while the second workman returned to the loading station for another stack of batts, which would constitute the first stack in the next packaging operation.

The present invention provides a method and apparatus for handling stackable bodies and specifically compressible batts of glass fiber insulation in a manner to eliminate the second workman. The first, and only, workman removes the batts sequentially from the conveyor line and stacks them in a predetermined number or height at the stacking station. This stack of batts is then moved away from the stacking position and compressed, but while still at the stacking station, however. This is accomplished by a batt compreswing and handling unit equipped with batt-engaging members having fingers which engage and compress the stacks of batts. The workman continues to stack a second predetermined number of the batts at the station with this second stack compressed in adjacent relationship with the first stack. The two compressed stacks are then moved together to the packaging station by the unit and into a packaging chamber, with the compressive forces applied by the fingers on the two stacks being released or at least reduced during this movement from the stacking station to the packaging station. Suction is applied at the packaging station to longitudinal edges of the batts to hold them in the packaging chamber as the fingers are retracted. The two stacks are then compressed again and packaged, as before.

The handling of the batts is accomplished with the unique batt compressing and carrying unit. The batt-engaging members of the unit include a set of stationary fingers, and a first set of movable fingers which compresses a first stack of batts between the first set of movable fingers and the stationary set. The batt-engaging members further include a second set of movable fingers which compresses the second stack of batts between the first movable set of fingers and the second movable set. The three sets of fingers hold the two stacks of batts in compression as they are carried by the unit from the stacking station to the packaging station. As the fingers move the two stacks toward and into a packaging chamber, of the packaging station, the two sets of movable fingers begin to move apart and away from the stationary set of fingers to release the compressive forces on the two stacks. As suction is applied to longitudinal edges of the batts in the stack in the packaging chamber, the fingers move apart further to relieve substantially all compressive forces on the batts and to enable the fingers to be withdrawn more easily from the two stacks of batts. The two stacks are then compressed in the packaging chamber by separate compressive means and packaged into a bag-like container. The unit then returns the batt-engaging members to the stacking station where additional stacks are received and compressed, the workman continuing to stack the batts from the conveyor line while the earlier stacks were moved to the packaging station. With this arrangement, the second workman is eliminated entirely and the overall operation of stacking and packaging the batts is conducted more smoothly.

It is, therefore, a principal object of the invention to provide an improved method and apparatus for handling stackable bodies.

Another object of the invention is to provide an improved method and apparatus for stacking and packaging compressible batts of glass fiber insulation.

A further object of the invention is to provide an improved method and apparatus for producing packaged glass fiber insulating batts with less labor.

Many other objects and advantages of the invention will be apparent from the following detailed description of a preferred embodiment thereof, reference being made to the accompanying drawings, in which.

Figure 1:
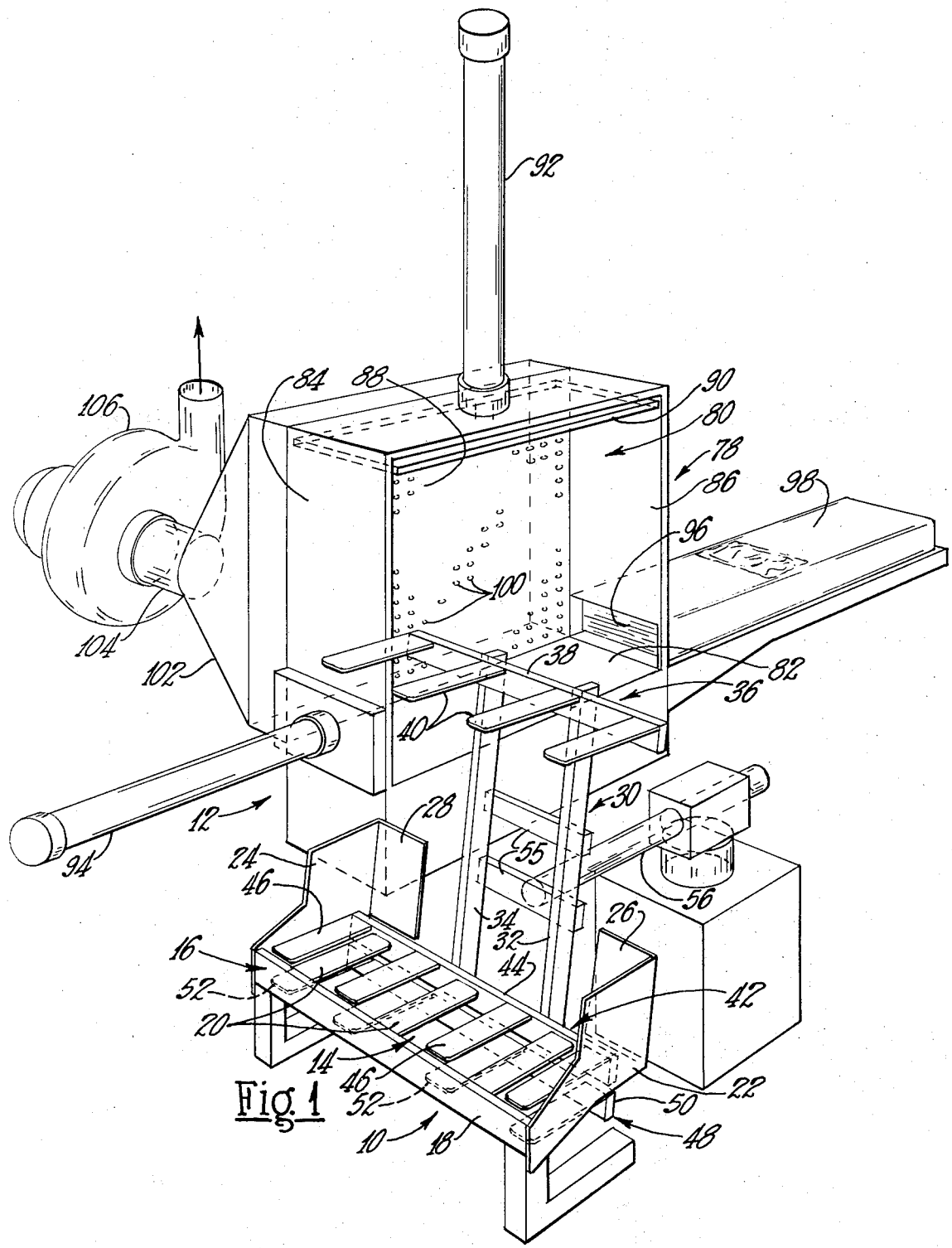
FIG. 1 is a somewhat schematic, overall view in perspective of apparatus for compressing and carrying stacks of batts of glass fiber insulation and apparatus for packaging the batts.

Referring to the drawings, and particularly to FIG. 1, a loading or stacking station is indicated at 10 and a packaging station is indicated at 12. Batts of glass fiber insulation are sequentially transferred by a workman to the stacking station from a conveyor (not shown) which is located along side the station. The stacking station 10 includes a loading or stacking position indicated at 14 which is determined or established by a table 16. The table 16 includes a frame 18 with bars or fingers 20 extending rearwardly therefrom and defining a supporting surface for the batts. The batts are stacked longitudinally on the table 16 with end walls 22 and 24 helping to align the batts longitudinally and with back panels 26 and 28 aligning the batts transversely.

A batt compressing and carrying unit embodying the invention is indicated at 30. The unit 30 includes upright supports or guides 32 and 34, at the upper ends of which is a stationary batt-engaging member 36 including a frame 38 and stationary fingers 40. A first movable batt-engaging member 42 is guided by the upright supports 32 and 34 for movement toward and away from the stationary batt-engaging member 36, and has a first or lower position 42-1 below the table 16. The first movable member 42 includes a frame 44 and a plurality of fingers 46. A second movable batt-engaging member 48 is also supported and guided by the upright members 32 and 34 for movement toward and away from the stationary member 36, and has a first, lower position 48-1 below the first movable member 42 and below the table 16. The second movable batt-engaging member also includes a frame 50 and fingers 52. The movable members 42 and 48 are moved up and down on the supports 32 and 34 by reversible motors 53 (FIG. 2) located thereabove and driving chains or cables 54, each connected to one of the members 42 or 48. These drive components are not shown in FIG. 1 for clarity of illustration.

The upright supports 32 and 34 have cross bars 55 (FIG. 1) which are connected to an end of a main supporting shaft 56 by a pin 58 (FIG. 2) and ears 60 for pivotal movement with respect thereto. The upright supports 32 and 34 can be moved from a slanted position when at the stacking station 10, to a vertical position when retracted to a dotted line position indicated at 62, by a hydraulic cylinder 64. The cylinder has one end pivotally connected to the ears 60 and the opposite end connected to the upright supports through a piston rod.

The shaft 56 is supported and moved by a robot mechanism 66, several of which are commercially-available, an example being one available from AMF Inc., under the name Versatran. The mechanism 66 includes a main housing 68 on which is pivotally mounted a hub 70. A hydraulic cylinder 72 is mounted on the hub 70 and has a piston rod attached through a connecting plate 74 to the shaft 56. When the piston is moved toward an extended position, the shaft 56, an intermediate portion of which is slidably carried by the hub 70, moves rearwardly to move the unit 30 to the retracted position 62. When the unit 30 is in the retracted position, the hub 70 can be pivoted about a vertical axis by means of a suitable motor 76 in the ousing 68, to align the shaft 56 with the packaging station 12. At this time, the piston in the cylinder 72 can be retracted to move the unit 30 toward the packaging station.

A packaging machine 78 at the packaging station is of a type basically known in the art. The machine comprises a compression chamber 80 formed by a base 82, end walls 84 and 86, and a back wall 88. Batts in the chamber 80 are compressed by an upper plate 90 powered by a hydraulic cylinder 92. When the batts are compressed to their lowest position on the base 82, a plunger (not shown), operated by a cylinder 94, pushes the compressed batts through an opening 96 in the end wall 86 and into a bag or container 98.

In accordance with the invention, the packaging machine 78 has means to retain the batts in the compression chamber 80 when placed therein by the batt-engaging members 36, 42, and 48, to enable the fingers to be withdrawn from between and around the batts. To achieve this, the back wall 88 is provided with a multiplicity of perforations 100 extending substantially uniformly thereover. The perforations communicate with a suction chamber 102 located therebehind which in turn communicates through an exhaust pipe 104 with a large blower 106. Longitudinal edges of the batts are held by the suction against the back wall 88 to enable the batts to be retained in the chamber 80 as the fingers of the batt-engaging member 36, 42, and 48 are withdrawn and the unit 30 is moved to a retracted position from the packaging machine 78. At this time, the batts are compressed and packaged and the unit 30 is pivoted back to the first position with the shaft 56 then extended to move the unit 30 into position at the stacking station 10. The movable batt-engaging units 42 and 48 are moved back below the stacking position 14, as determined by the table 16, before the unit 30 reaches the stacking position.

Figure 2:
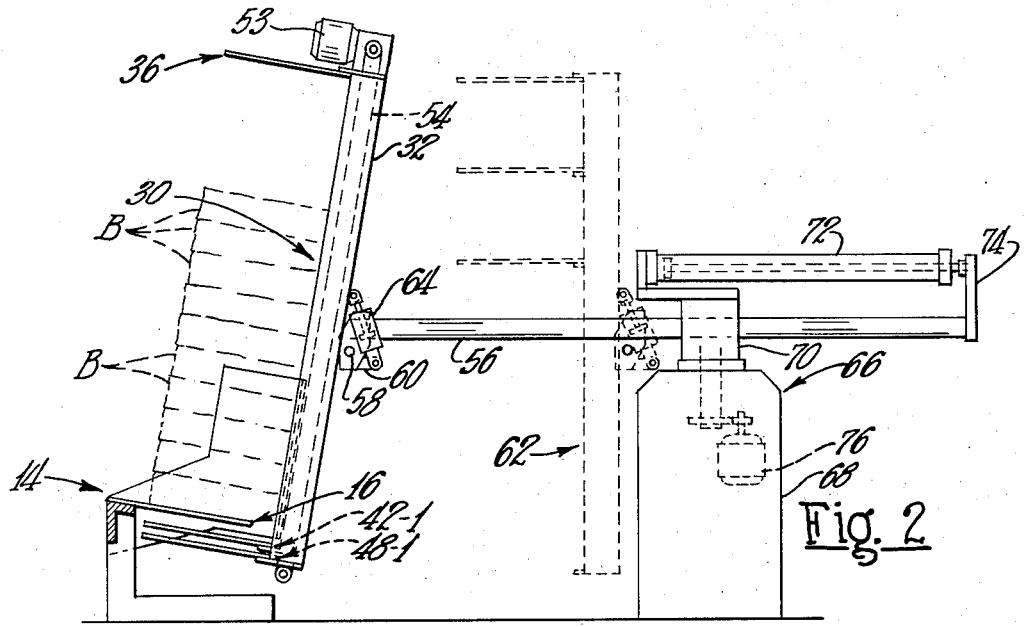
FIG. 2 is a somewhat schematic side view in elevation, of the apparatus for carrying and compressing stacks of batts, with a portion of the apparatus being shown in a second position in dotted lines.
Figures 3, 4:
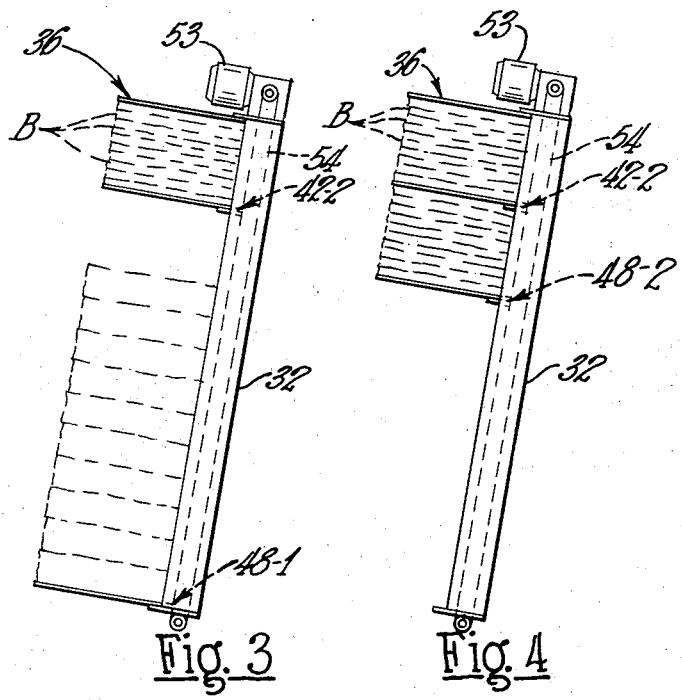
FIGS. 3 and 4 are schematic side views of the apparatus for compressing the batts shown in second and third positions.

The unit 30 is shown in its initial stacking position in FIG. 2. At this time, the batt-engaging members 36, 42, and 48 are in the slanted positions parallel to the table 16, with the upright supports 32 and 34 at an angle to the vertical. The first movable batt-engaging member 42 is in its lowest position 42-1, just below the table 16, and the second movable batt-engaging member 48 is in its lowest position 48-1, just below the lowest position of the member 42. Batts B are stacked on one another on the table 16 and specifically on the bars 20 thereof, with the batts lying longitudinally of the table and aligned with the aid of the end walls 22 and 24 and the back walls 26 and 28. When the batts are stacked in a predetermined number or to a predetermined height, e.g., 60 inches, the first movable batt-engaging member 42 is raised to an upper position designated 42-2 in FIG. 3. The batts B at this time are compressed to a fraction of their original height, e.g., 20 inches, between the stationary member 36 and the first movable member 42.

A second stack of the batts B are immediately stacked on the table 16, usually to the same height as the first stack. To facilitate stacking of the second stack of batts, the table 16 can be lowered somewhat, if desired, to provide more space between the table and the first movable member 42 in its upper position 42-2. With the second stack finished, the second movable member 48 is moved from its lowest position 48-1 below the table 16 to an upper position designated 48-2 in FIG. 4. At this time, the second stack of the batts B is compressed to a fraction of its original height, e.g., 20 inches, between the movable members 42 and 48. In the second position of the movable member 48, both of the compressed stacks of batts are above the upper edges of the back panels 26 and 28. Consequently, the unit 30 can be retracted to the rear of the panels 26 and 28 and at the same time pivoted to the upright position, as shown at 62 in FIG. 2.

The robot hub 70 is then pivoted, about 90° in this instance, to align the shaft 56 with the compression chamber 80 of the package machine 78. The shaft is then extended forwardly to move the two stacks of compressed batts carried by the unit 30 into the chamber 80. The movable batt-engaging members 42 and 48 can begin to move back toward their lowest positions 42-1 and 48-1 as the unit moves into the chamber so that the batts in the two stacks will substantially fill the chamber 80 by the time the members 36, 42, and 48 enter it. With less compressive force on the batts, it is much easier for the fingers 46 and 52 to be withdrawn from between and around the batts which are held in the chamber 80 by means of the suction as the fingers are retracted. After the fingers of the members 36, 42, and 48 are withdrawn, the plate 90 can be moved downwardly to compress the batts again for packaging into the container 98.

While the above is occurring, the workman continues to stack another first set of batts on the table 16 so that by the time the unit 30 again returns to the position of FIG. 2, another first stack of batts may be ready to be compressed. The first movable member 42 then moves upwardly with its fingers 46 moving between the bars 20 once again to move the first stack of batts into the compressed position between the stationary member 36 and the first movable member 42 in its upper position 42-2. The rest of the cycle is then similarly repeated.

The movement of the batt-enaging members 42 and 48 can be controlled manually by an operator through a control panel (not shown) located adjacent the stacking position 10. The other movements of the robot mechanism 66 and the related components can be controlled either manually or by suitable means, such as limit switches or timers, as is well known in the art.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. Apparatus for handling a plurality of stackable bodies comprising supporting means for supporting a plurality of the bodies on top of one another, stationary body-engaging means located a distance above said supporting means, movable body-engaging means, means for moving said movable body-engaging means from a position below said supporting means to a position above said supporting means spaced a predetermined distance from said stationary body-engaging means, and means for moving said stationary body-engaging means, said movable body-engaging means, and said means for moving said movable body-engaging means as a unit away from said supporting means when said movable body-engaging means is in the upper position.

2. Apparatus according to claim 1 characterized further by means connecting said stationary body-engaging means and said movable body-engaging means, said connecting means being located at an angle to the vertical when said stationary body-engaging means is above said supporting means, and means for moving said connecting means to a substantially vertical position when said stationary body-engaging menas is away from said supporting means.

3. Apparatus for handling a plurality of stackable bodies comprising supporting means for supporting a plurality of the bodies on top of one another, stationary body-engaging means located a distance above said supporting means, movable body-engaging means, means for moving said movable body-engaging means from a position below said supporting means to a position above said supporting means spaced a predetermined distance from said stationary body-engaging means, second movable body-engaging means, and second means for moving said second movable body-engaging means from a position below said supporting means to a position above said supporting means spaced a predetermined distance from said stationary body-engaging means, which distance is greater than the predetermined distance between the stationary body-engaging means and the first movable body-engaging means when in its upper position.

4. Apparatus according to claim 3 characterized by means for moving said stationary body-engaging means, said first and second movable body-engaging means, and said first and second means for moving said movable body-engaging means as a unit away from said supporting means when said first and second movable body-engaging means are in their upper positions.

5. Apparatus according to claim 4 characterized further by means connecting said stationary body-engaging means and said first and second movable body-engaging means, said connecting means being located at an angle to the vertical when said stationary body-engaging means is above said supporting means, and means for moving said connecting means to a substantially vertical position when said stationary body-engaging means is away from said supporting means.

6. Apparatus for handling a plurality of compressible batts comprising supporting means for supporting a plurality of the batts on top of one another, stationary finger means located in a position to engage a surface of one of the outermost batts of the stack, movable finger means, means for moving said movable finger means from a position spaced from said stationary finger means a first predetermined distance to a second position spaced from said stationary finger means a second predetermined distance which is less than the first predetermined distance, and a second set of movable finger means.

7. Apparatus according to claim 6 characterized by means for moving said second movable finger means from a first position spaced from said stationary finger means a first predetermined distance which is more than the first predetermined distance of said first movable finger means, to a second position spaced from said stationary finger means a second predetermined distance which is more than the second predetermined distance of said first movable finger means.

8. Apparatus for handling compressible batts comprising stationary batt-engaging means, means for supporting said batt-engaging means in a predetermined position, first movable batt-engaging means having a first position spaced a given distance from said stationary means and a second position closer to said stationary means, second movable batt-engaging means having a first position spaced a given distance from said stationary means and a second position spaced closer to said stationary means but farther from said stationary means than said first movable batt-engaging means, means for moving said first movable means between its first and second positions, and means for moving said second movable means between its first and second positions, whereby a plurality of compressible batts can be compressed between said stationary means and said first movable means when in its second position, and a second plurality of compressible batts can be compressed between said second movable means and said first movable means when said first movable means is in its second position and said second movable means is in its second position.

9. Apparatus according to claim 8 characterized by said first position of said first movable means being closer to said stationary means than said first position of said second movable means.

10. Apparatus according to claim 8 characterized by said first and second positions of said first and said second movable means being below said stationary means.

11. Apparatus according to claim 10 characterized by said first and said second positions of said second movable means being below the corresponding first and second positions of said first movable means.

12. Apparatus according to claim 8 characterized by table means for supporting the batts, means for supporting said table means in a position which is closer to said stationary means than is either of said movable means when in their first positions.

13. A method of handling a plurality of compressible batts at a stacking station and for transferring them to a packaging station, said method comprising stacking a plurality of the batts on top of one another in contiguous, parallel relationship, at the stacking station, exerting forces on opposite major surfaces of the outermost batts to compress the stack of batts, stacking a second plurality of the compressible batts on top of one another at the stacking station with the batts being in contiguous, parallel relationship, exerting forces on opposite major surfaces of the outermost batts of the second stack to compress the second stack of batts immediately adjacent the compressed first stack of batts, and moving said compressed first and second stacks of batts as a unit from the stacking station to the packaging station.

14. A method according to claim 13 characterized further by moving the first stack of batts upwardly as the compressive forces are exerted thereon, and moving the second stack of batts upwardly as the compressive forces are exerted thereon.

15. A method according to claim 13 characterized further by releasing some of the compressive forces on both stacks of batts as the batts are moved from the stacking station toward the packaging station.

16. A method according to claim 13 characterized further by applying suction to longitudinally extending edges of the batts in both of the said stacks at the packaging station, and completely removing the compressive forces on the batts of both of said stacks.

17. A method according to claim 16 characterized further by simultaneously compressing both stacks of batts at the packaging station and placing the compressed batts in a package.

18. A method of handling and packaging a plurality of compressible batts, said method comprising sequentially removing a plurality of the batts from a conveyor line and stacking them on one another in contiguous, parallel relationship, compressing the stack of batts, sequentially removing a second plurality of the compressible batts from the conveyor line and stacking them on one another in contiguous, parallel relationship, compressing the second stack of batts adjacent the compressed first stack of batts, moving said compressed first and second stacks of batts as a unit from the stacking location, and placing the two stacks of batts in a package.

19. A method according to claim 18 characterized by moving the first stack of batts upwardly as it is compressed and moving the second stack of batts upwardly as it is compressed.

20. A method according to claim 18 characterized further by releasing the compression on both stacks of batts as they are moved away from the stacking location toward the location in which they are packaged.

21. A method according to claim 20 characterized further by compressing both of said stacks of batts together as a unit at the packaging location prior to packaging them.

* * * * *